Figure 7:
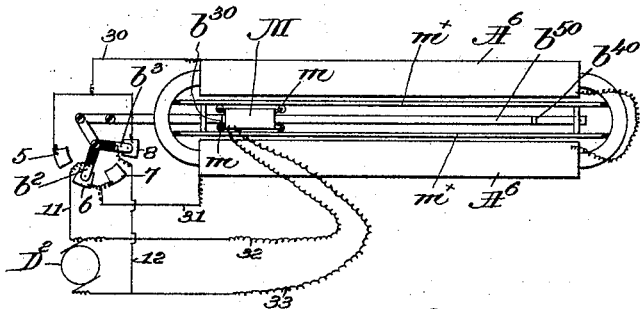

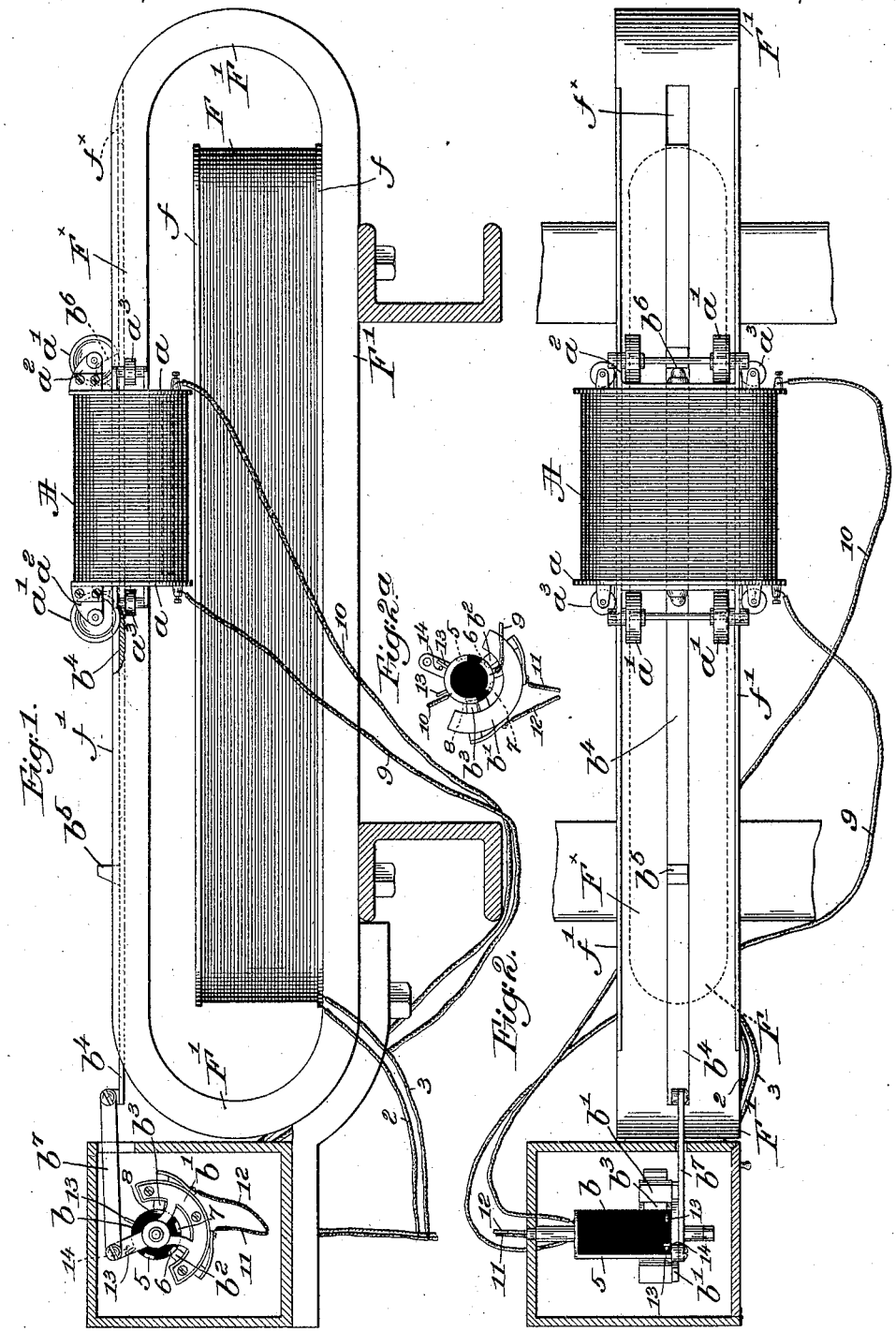

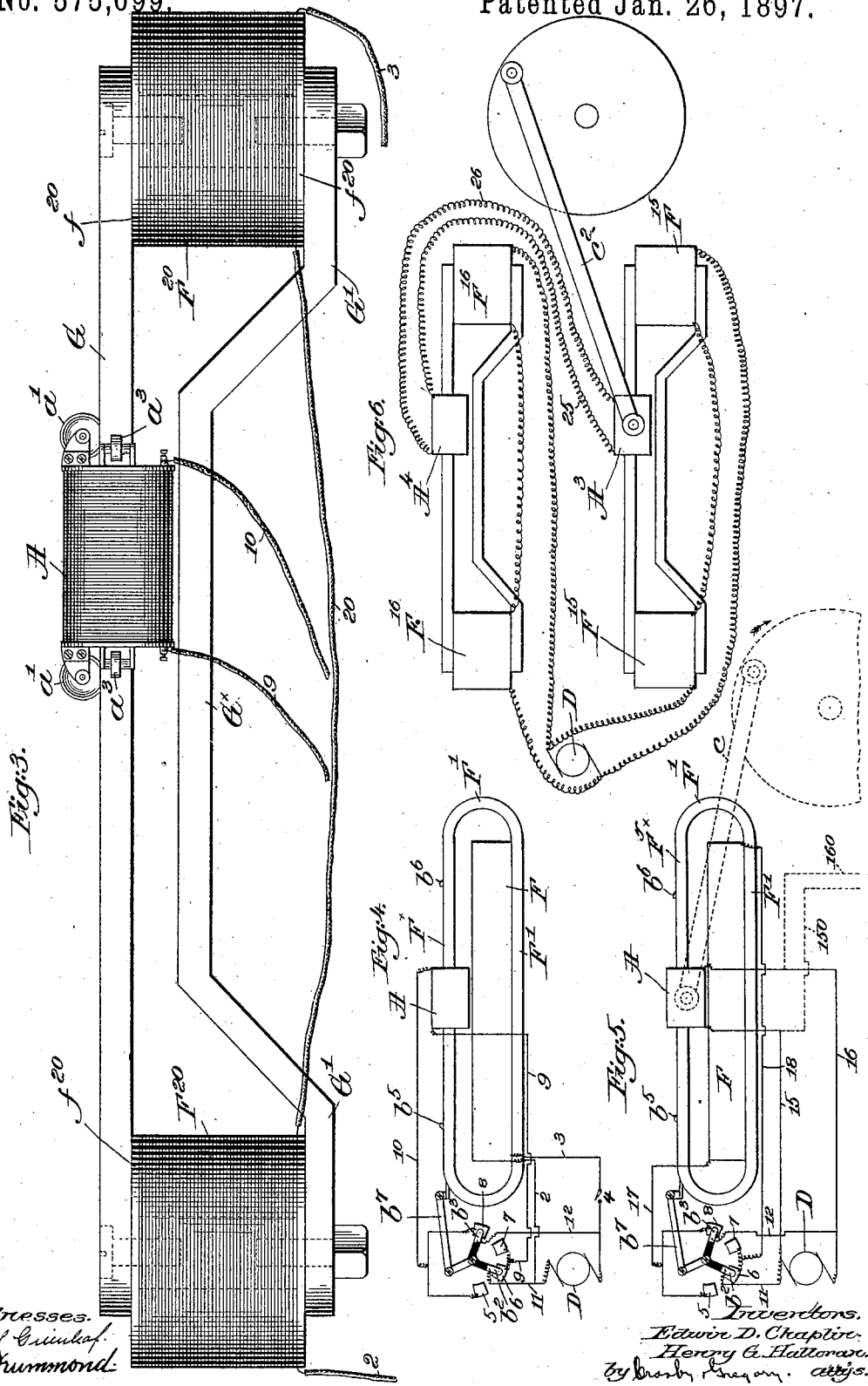

(No Model.) 3 Sheets—Sheet 3.

E. D. CHAPLIN & H. G. HALLORAN.
ELECTROMECHANICAL MOVEMENT.

No. 575,699. Patented Jan. 26, 1897.

Witnesses.
Fred S. Greenleaf.
Thomas J. Drummond.

Inventors
Edwin D. Chaplin.
Henry G. Halloran.
By Crosby & Gregory
attys.

UNITED STATES PATENT OFFICE.

EDWIN D. CHAPLIN, OF CAMBRIDGE, AND HENRY G. HALLORAN, OF BOSTON, MASSACHUSETTS, ASSIGNORS TO THE CHAPLIN COMPANY, OF KITTERY, MAINE.

ELECTROMECHANICAL MOVEMENT.

SPECIFICATION forming part of Letters Patent No. 575,699, dated January 26, 1897.

Application filed March 21, 1896. Serial No. 584,257. (No model.)

*To all whom it may concern:*

Be it known that we, EDWIN D. CHAPLIN, of Cambridge, county of Middlesex, and HENRY G. HALLORAN, of Boston, county of Suffolk, Commonwealth of Massachusetts, have invented an Improvement in Electromechanical Movements, of which the following description, in connection with the accompanying drawings, is a specification, like letters and figures on the drawings representing like parts.

This invention has for its object the production of a novel electromechanical movement adapted to be used in various classes of mechanism wherein the power is transmitted from a member having a reciprocating movement, as in the case of rock-drills and the like, though the invention may be applied with equal facility to various other classes of devices.

Drills or similar instruments have been devised wherein a magnetic plunger has been reciprocated in a solenoid by intermittent and pulsating currents and by means of two oppositely-acting coils, the details and manner of working out the problem differing, but all depending upon the solenoid principle for their operation. In this invention we have departed entirely from the solenoid principle, and we base our invention on the fact that, given a field-magnet and a coil-armature, one of which is reciprocable relatively to the other, the lines of force of the field intersecting the coil of the armature, the production of a current in the coil-armature will tend to cause relative movement of said field-magnet and armature in a direction depending upon the direction of the current, reversal of the latter reversing the direction of relative movement of the two parts, so that by changing the direction of current in any suitable manner the movement of one of the parts relatively to the other becomes a reciprocation which can be utilized for many useful purposes.

The apparatus hereinafter to be described may operate either as a generator or a motor, for if the coil-armature be positively reciprocated relative to the field-magnet current will be generated, which may be conducted to other armatures to reciprocate them, the change in direction of movement of the first armature causing a change in the direction of the current conducted to the other armatures, causing their reciprocation, the magnetic field or fields remaining constant. As will also appear hereinafter, by using an electromagnet for the field, the preferable form for numerous practical reasons, either the field-magnet or the coil-armature may reciprocate relatively to the other, and the current produced in either one may have its direction changed in accordance with the reciprocation. Such change of current-direction will result in reciprocation if the apparatus be used as a motor, while if used as a generator the reciprocation will generate a current which will be alternating in its direction or direct, according to whether the field be maintained constant or is changed as to the direction of its current in unison with the reciprocation of the generating member.

The field-magnet and armature are so arranged, whether the apparatus operates as a generator or motor, that the lines of force of the field will intersect the coil of the armature, the latter being exterior thereto, as distinguished from the magnetic member of a solenoid, which is surrounded by the field.

The change of direction of the current may be controlled in various ways, some of which are hereinafter described, and various forms of apparatus are shown in the accompanying drawings.

Figure 8:
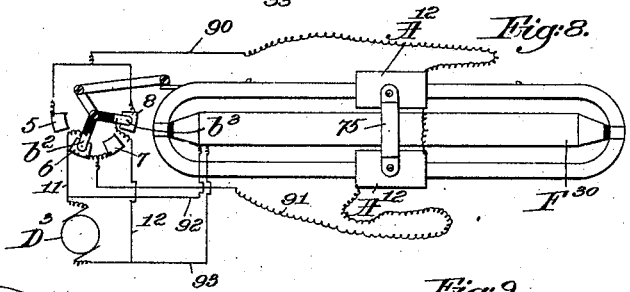
Figure 9:
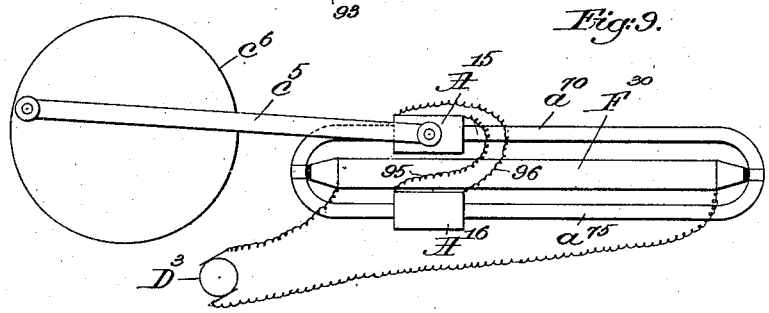
Figure 10:
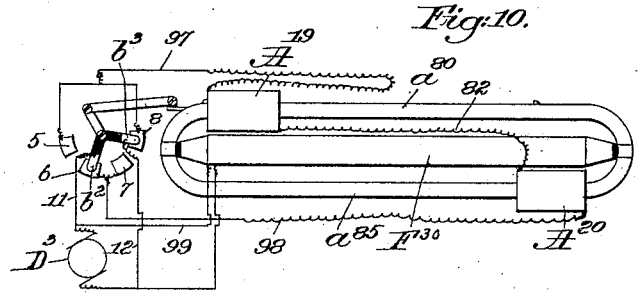

Figure 1, in side elevation and partially in section, represents one form of apparatus embodying our invention. Fig. 2 is a top or plan view thereof; Fig. 2$^a$, an opposite end view of the current changing or reversing mechanism shown in Figs. 1 and 2. Fig. 3 shows a modified form of field-magnet, to be described. Fig. 4 is a diagrammatic view of the apparatus shown in Figs. 1 and 2, showing the manner in which the current is reversed in the coil-armature. Fig. 5 is a similar view showing the current-changing mechanism as connected with the field-magnet, and by dotted lines means are shown for moving the armature positively, whereby the apparatus may be used as a direct-current generator. Fig 6 is a diagrammatic view of an apparatus embodying our invention and combining both generator and motor. Fig. 7 is a diagrammatic view of one form of apparatus wherein the field-magnet reciprocates relatively to the coil-armature; and Figs. 8, 9, and 10 are also diagrammatic views of apparatus embodying our invention, wherein a plurality of coil-armatures move in a common magnetic field, such modifications being adaptable for various purposes.

Referring to Figs. 1 and 2, we have shown an electro field-magnet comprising a coil F, wound upon a suitable soft-iron core (partially shown at $f$) and elongated to present a length much greater than its width, the core being firmly secured in suitable manner, as by bolts, to a pole-piece F', preferably of soft iron, having long sides parallel to each other and to the long axis of the coil F, the upper side $F^\times$ of the pole-piece forming an armature directrix or support.

When a current is passed through the field-coil F, the lines of force extend upwardly therefrom to the side $F^\times$ of the pole-piece and follow substantially the curved ends thereof in their path, making a substantially uniform magnetic field throughout its length.

The current may be produced in the electro field-magnet in various ways, a dynamo D being employed for the purpose in the diagrammatic views of the drawings, Figs. 4 and 5 showing two arrangements, in the former wires 2 3, connecting the ends of the coil F and the poles of the dynamo, so that the field is constant, a suitable switch 4 throwing the field-coil into or out of the dynamo-circuit.

A coil-armature A, of insulated wire, is wound upon a preferably non-magnetic core or frame $a$, the coil surrounding the directrix $F^\times$, upon which it is longitudinally movable.

In order to reduce friction, rolls $a'$ are mounted in ears $a^2$ of the core to travel upon the directrix $F^\times$, provided with longitudinal upturned ribs or rails $f'$, as shown in Figs. 1 and 2, and, if desired, guide-rolls $a^3$ may be mounted on the armature-core to bear against the sides of the directrix and prevent lateral displacement of the armature.

The antifriction-rolls are not necessary, but in some cases are highly desirable, and with or without them the pressure of the coil-armature upon the directrix may be neutralized to a large extent by inserting in the lower portion of the coil a piece of soft iron, as $A^\times$, of suitable size and shape, the magnetization of the same as it passes through the field causing a pull toward the directrix opposite to the pressure of the armature thereon.

It is necessary to produce a current in the coil A in order that the intersection of the coil by the lines of force of the field will cause movement of the armature through said field, and in Figs. 1, 2, and 3 this armature-current is produced by the dynamo D, the direction of current in the armature being controlled by the latter.

A simple form of reversing-switch is shown in Figs. 1, 2, and $2^a$, consisting of a series of contacts 5, 6, 7, and 8, mounted on a support $b$, of insulating material, the contacts 5 and 8 being electrically connected with the wire 10 from one end of armature-coil A and contacts 6 and 7 with wire 9 from the other end of the coil A.

The movable switch member $b'$ has two contacts $b^2$ $b^3$, which are connected by wires 11 and 12 to the dynamo D, said contacts engaging the contacts 6 8 simultaneously, as in the figures referred to, the current passing through the coil A in one direction and in the opposite direction when $b^2$ $b^3$ are on contacts 5 and 7.

In order to throw the switch at the proper time, we have shown the directrix longitudinally grooved at $f^\times$ to receive therein a slide-rod $b^4$, having upturned lugs $b^5$ $b^6$ in the path of and to be engaged by the armature A in its stroke, said bar being connected by a link $b^7$ with the movable switch member $b'$.

There is sometimes danger of the movable switch member $b'$ being moved too far, and this is obviated by connecting the two members $b$ and $b'$ by the stop-and-pin arrangement shown in Figs. 1, 2, and $2^a$, so that if the member $b'$ is moved too far the member $b$ will move in unison therewith when stop 13 and pin 14 engage.

From the foregoing it will be understood that if the coil-armature has a current produced therein the effect of the lines of force of the field intersecting, mainly, the lower or adjacent portion of the coil A will be to move the latter through the field. If now the direction of current through the coil-armature is reversed, the direction of movement of the armature will be reversed and it will be moved back through the field, and by the means described the reversal of current in the armature is effected at the end of each stroke thereof. Consequently the armature will be reciprocated in the field, and a drill or other device connected to the armature will be driven thereby. Owing to the uniformity of the field the power of the armature will be substantially uniform throughout the stroke.

The reciprocations may be very rapid, as the change of direction of the armature-current is instantaneous, but for some purposes it is desirable to have the speed of the stroke gradually quicken from the beginning. To accomplish this readily, the direction of current in the field-magnet may be changed, for the demagnetization of the core and pole-piece is accomplished more slowly and there will be a dwell at the end of each stroke of the movable member of the apparatus. We have shown in Fig. 5 simple means for accomplishing this result, the coil-armature A being directly connected with the dynamo D by wires 15 and 16, while the terminals 17 and 18 of the field-magnet coil F are connected to the contacts 5 8 and 6 7 of the switch or current changer, which is shown the same as in Fig. 4.

Referring to Fig. 5, the coil-armature A may be positively reciprocated in the field, as by a crank-arm $c$, (see dotted lines,) driven from any suitable source of power, and the coil-terminals 150 160, in dotted lines, are led to any desired point where direct current is is to be produced. The movement of the armature through the field then generates a current in the armature, and if the current of the field-magnet is reversed at each stroke of the armature the current generated by the latter will be direct instead of alternating. To reverse the field-magnet current, the switch shown can be readily employed, as will be obvious, and it will be understood that the exciting-dynamo is of the direct-current type, as opposed to the alternating-current generator.

Any suitable form of current-reverser or switch may be employed, and the operation of the reversing device may be controlled otherwise than by the coil-armature.

The construction of the field-magnet in Fig. 3 is somewhat different, the directrix G of soft iron being rigidly secured at its ends to the magnetic cores $f^{20}$ of the two field-magnet coils $F^{20}$, the other ends of the cores being rigidly secured to a second bar G' of soft iron, bent up at $G^{\times}$ toward the directrix G. The coil-armature A is the same as hereinbefore described and moves back and forth on the directrix in the field.

Field and armature currents may be controlled as in either Fig. 4 or Fig. 5, but in this form of apparatus the strength of the field is not uniform, being strongest near the coils $F^{20}$ and diminishing in strength or intensity toward the center of the directrix. The coils $F^{20}$ are connected by wire 20 and the terminals 2 3 are connected to dynamo or switch as described.

A series of armatures may be employed as motors in connection with another operating as a generator, one form of such apparatus being shown diagrammatically in Fig. 6. Two field-magnets are shown, the coils $F^{15}$ $F^{16}$ of which are energized or excited by a direct-current dynamo D, it being understood that any number of field-magnets desired may be used. In one of the fields the coil-armature $A^3$ is positively reciprocated by any suitable means, as a crank-arm $c^2$, and it is electrically connected by the wires 23 26 with the coil-armature $A^4$ in the other field. Armature $A^3$ thus generates current by its reciprocations, reversing the direction of current at each stroke, and this reversal of current in armature $A^4$ causes it to reciprocate in its field substantially in unison with the generator-coil $A^3$.

A dwell at the end of the stroke of the motor armature or armatures can be attained by making the motor-stroke shorter than the stroke of the generating-armature, so that the former will reach the end of the stroke first and will have to wait for the generator-armature to catch up at the end of its stroke.

If a plurality of motor-armatures are used, they may be connected in series, their united potential being equal to the potential of the generator-armature, or they may be connected in parallel, each having the same potential, but in such case more current will be required. In fact, the connecting of the armatures may be made according to the circumstance and conditions of different cases. Such an arrangement of a series of armatures could be employed in various ways, as, for instance, for driving a series of looms or other machines having the same motions and speed.

In Fig. 7 we have shown a construction wherein the field-magnet is reciprocable relatively to the coil-armature, the armature $A^6$ being coiled around the two straight parallel sides $a^{10}$ of a frame of soft iron, the terminals 30 and 31 leading to the fixed contacts 5 8 and 6 7 of the switch or current-reverser. An electromagnet M is shown as in electrical connection with an exciting-dynamo $D^2$ by wires 32 33, the magnet being shown as provided with rolls $m$ to run on guideways $m^{\times}$ between the coil-armatures $A^6$. The magnet is adapted to engage the projections $b^{30}$ $b^{40}$ on a switch-controller $b^{50}$, so that the direction of current in the field-magnet, as illustrated, or in the coil-armature will be reversed at each reciprocation. The electromagnet constitutes the field, the lines of force thereof being directed around by the frame $a^{10}$, so that the inner portion of the coil-armature will be intersected by said lines of force, causing movement of the field-magnet.

So far as the operation of the apparatus is concerned, therefore, it is immaterial whether the field-magnet move relatively to the coil-armature, or vice versa, the principle of operation being the same, and while we have herein illustrated an electro field-magnet as being the more convenient and generally efficient it is to be understood that where a constant field is employed a permanent field-magnet may be used with good results.

In Figs. 8, 9, and 10 the elongated field-magnet coil $F^{30}$ is shown as suspended between the sides of a frame of soft iron, the sides $a^{20}$ of which form directrixes for the coil-armatures $A^{10}$, which are thus reciprocated in the field. In each of said constructions a direct current is produced by suitable exciting means, as dynamo $D^3$, and Figs. 8 and 10 show a current-reversing device or switch similar to the one previously described.

Viewing Fig. 8, a duplex-coil armature $A^{12}$ is shown, connected by a suitable bridge or yoke 75, the switch being interposed between the coils and the exciting-dynamo $D^3$, so that current in the coils will be reversed at each stroke, the operation of the switch being controlled by the armature, as hereinbefore described. The two coils of the armature move on the directrixes $a^{20}$ on opposites of the field-coil $F^{10}$, each coil moving through the field at one side of the coil $F^{20}$. Wires 90 and 91 connect the terminals of the coils $A^{12}$ with the switch, and the dynamo is in circuit with the field-coil $F^{30}$ by wires 92 93. By the construction shown the mechanism to be driven can be located at each side of the field, or connection may be made with the bridge or yoke 75 of the duplex armature.

In Fig. 9 the coil-armature $A^{15}$ on the directrix $a^{70}$ is positively moved through the electromagnetic field of the coil $F^{30}$ and its pole-piece $a^{70}$ $a^{75}$ by means of a crank-arm $c^5$, driven suitably, as by a belt on a pulley $c^6$, or by direct connection to a crank-shaft of an engine. The coil-armature $A^{15}$ thus acts as a generator and is electrically connected by wires 95 96 with a motor coil-armature $A^{16}$ on the directrix $a^{75}$, also reciprocable in the magnetic field of the coil $F^{30}$, but on its opposite side the field being excited by a direct current, and the current generated by movement of armature $A^{15}$ will move motor-armature $A^{16}$ in unison therewith.

The apparatus may be so constructed that a pair of coil-armatures in electrical connection will move oppositely in the magnetic field, as shown in Fig. 10, wherein the pole-piece surrounds the field-coil $F^{30}$, and the coil-armatures $A^{19}$ $A^{20}$ are mounted to move on the parallel sides $a^{80}$ $a^{85}$ of the pole-piece.

A switch is included in the armature-circuit by wires 97 98, the field-coil being directly connected by wires 99 100 with the exciting-dynamo.

The coil-armature $A^{19}$ is wound in one direction, as shown by the arrow, for instance, and the coil-armature $A^{20}$ is oppositely wound, as indicated by its arrows, the wire being led from one to the other coil, as at 82, so that the passage of a current through the coils will cause them to move oppositely through the field.

From the various forms of apparatus herein shown, all depending upon the same general principle, it will be seen that the particular construction is not of the gist of our invention, and accordingly our invention is not restricted to the construction and arrangement herein set forth.

Inasmuch as the application of our invention may be extended to many and diverse forms of mechanism we have not deemed it necessary to show it in connection with any particular mechanical device.

Having fully described our invention, what we claim, and desire to secure by Letters Patent, is—

1. In an apparatus of the class described, an electro field-magnet and a coil-armature wholly exterior to the coil of said magnet one of which is reciprocable relatively to the other, the lines of force of the field intersecting the coils of the armature, means to produce a current in the field and armature, and means to change the direction of current of one of them, in accordance with the relative reciprocation of one to the other, substantially as described.

2. In an apparatus of the class described, an electro field-magnet, an armature wholly exterior to the coils thereof and reciprocable in its field and intersecting the lines of force thereof, means to produce a current in the armature, and a device for reversing the direction of the current at each stroke, substantially as described.

3. In an apparatus of the class described, an electro field-magnet, an armature reciprocable exterior to the coils thereof but intersecting the lines of force of the magnetic field, means to produce a current in the field and armature, and means to reverse the current of one at each stroke of the armature, substantially as described.

4. In an apparatus of the class described, an electro field-magnet, including an elongated coil, an armature reciprocable exterior to and in the direction of the length of the coil and in the magnetic field thereof, means to produce a current in the field and armature, and means to change the direction of current in one of them as the armature is reciprocated, substantially as described.

5. In an apparatus of the class described, a magnet having an extended pole to form an armature-directrix, a coil-armature to reciprocate on said directrix exteriorly to the body of the magnet, means to produce a current in the coil-armature, and means to reverse the direction of the current in accordance with the reciprocation of said coil-armature, substantially as described.

6. In an apparatus of the class described, a magnet having an extended pole to form an armature-directrix, a coil-armature to reciprocate on said directrix, means to produce a current in the coil-armature, and means controlled by said coil-armature to reverse the direction of current therein and thereby change its direction of movement, substantially as described.

7. An electromechanical movement comprising an electromagnet having one elongated pole, to form an armature-directrix, an armature-coil reciprocable on said directrix, the said coil cutting the lines of force of the field, means to produce a current in the field and armature coils, and means to change the direction of the current in one of them at each stroke of the armature, such reversal of current causing reciprocation of the latter, substantially as described.

8. An electromechanical movement comprising an electro field-magnet, an armature reciprocable exterior to the coils of said magnet and intersecting the lines of force thereof, means to produce a current in the field-magnet and armature, and means operated by the armature to change the direction of current of the field-magnet or armature at each stroke, the change of direction of current causing reciprocation of the armature, substantially as described.

9. In an apparatus of the class described, a field-magnet, a coil-armature reciprocable in the field thereof, and a metallic directrix for the said armature, combined with a magnetically-controlled device carried by the armature, tending to neutralize the pressure of the armature on the directrix, substantially as described.

10. In an apparatus of the class described, a field-magnet, a coil-armature reciprocable in the field thereof, and a metallic directrix for the said armature, combined with a magnetically-controlled device carried by the armature, tending to neutralize the pressure of the armature on the directrix, means to produce a current in the coil-armature, and means to reverse the current thereof, substantially as described.

11. In an apparatus of the class described, a field-magnet, a plurality of coil-armatures reciprocable in the field thereof and electrically connected therewith, and means to positively reciprocate one of said coil-armatures in the field to control the direction of current and thereby the direction of movement of the other armatures, substantially as described.

12. A plurality of field-magnets and their armatures, each field-magnet and its armature being relatively reciprocable, means to produce a current in said fields or armatures, and means to reverse the current in accordance with the relative reciprocation of the field-magnets and armatures, substantially as described.

13. In an apparatus of the class described, a field-magnet and a coil-armature, one of which is reciprocable relatively to the other, the lines of force of the field intersecting the coil of the armature, means to produce a current in the coil, and means to reverse the direction of current in the coil, in accordance with the relative reciprocation of field-magnet and armature, substantially as described.

14. In an apparatus of the class described, a field-magnet and a coil-armature, one of which is reciprocable relatively to the other, the lines of force of the field intersecting the coil of the armature, means to produce a current in the coil, and means controlled by such relative reciprocation to govern the direction of current in the coil-armature, substantially as described.

In testimony whereof we have signed our names to this specification in the presence of two subscribing witnesses.

EDWIN D. CHAPLIN.
HENRY G. HALLORAN.

Witnesses:
JOHN C. EDWARDS,
AUGUSTA E. DEAN.